United States Patent
Gross et al.

(10) Patent No.: US 6,265,071 B1
(45) Date of Patent: *Jul. 24, 2001

(54) BRAKE UNIT INCLUDING BRAKE DISC AND BRAKE LINING

(75) Inventors: Gerhard Gross, Böbingen; Tilmann Haug, Uhldingen-Mühlhofen; Emil Näumann, Ebersbach; Kolja Rebstock, Ulm; Michael Scheydecker, Nersingen, all of (DE)

(73) Assignee: Daimler-Benz Aktiengesellschaft, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,616

(22) Filed: Sep. 15, 1998

(51) Int. Cl.[7] ................................. B32B 9/00; F16D 69/00

(52) U.S. Cl. ..................... 428/408; 428/469; 428/698; 188/251 A; 188/251 M

(58) Field of Search ................ 188/251 A, 251 M, 188/251 R, 255; 106/36; 428/212, 218, 408, 698

(56) References Cited

U.S. PATENT DOCUMENTS

| | | | |
|---|---|---|---|
| 3,891,398 | * 6/1975 | Odier | 29/182.2 |
| 4,226,759 | * 10/1980 | Chester | 260/38 |
| 5,007,508 | * 4/1991 | Lacombe | 188/251 A |
| 5,024,899 | * 6/1991 | Lang | 428/550 |
| 5,576,369 | * 11/1996 | Kudo et al. | 524/413 |
| 5,803,210 | * 9/1998 | Kohno et al. | 188/73.1 |
| 5,817,411 | * 10/1998 | Nakajima | 428/334 |

FOREIGN PATENT DOCUMENTS

| | | |
|---|---|---|
| 1 220 212 | 6/1966 | (DE) . |
| 21 13 037 B2 | 9/1971 | (DE) . |
| 26 37 634 C2 | 12/1978 | (DE) . |
| 35 15 512 A1 | 10/1986 | (DE) . |
| 37 43 373 C3 | 1/1991 | (DE) . |
| 42 23 417 A1 | 1/1994 | (DE) . |
| 43 06 721 A1 | 9/1994 | (DE) . |
| 43 22 113 | 12/1994 | (DE) . |
| 298 04 229 | 5/1998 | (DE) . |
| 197 11 829 | 9/1998 | (DE) . |
| 197 11 830 A1 | 10/1998 | (DE) . |
| 0 515 193 A2 | 11/1992 | (EP) . |
| WO 97/43560 | 11/1997 | (WO) . |

OTHER PUBLICATIONS

Dollhopf, V. et al., "Entwicklung integraler Leichtbaustrukturen aus Faserkeramik," VDC Berichte Nr. 1080, 1994, pp. 473–483. (no month).

Mühlratzer, Aug., "Fasterverbundkeramik –Entwicklung und Einsatzmöglichkeigten," MAN –Forschen –Planen – Bauen, Aug. 12, 1993, pp. 48–55.

* cited by examiner

Primary Examiner—Timothy M. Speer
Assistant Examiner—Bryant Young
(74) Attorney, Agent, or Firm—Kenyon & Kenyon

(57) ABSTRACT

A brake unit includes a brake disc of a ceramic material and a brake pad that cooperates with it in tribological fashion. The brake pad is made of a sintered metal material or of an inorganically bound material having a ceramic binding phase and metal particles. The brake unit has a high thermal loading capacity, very good performance characteristics in terms of comfort, and an acceptable service life.

23 Claims, 3 Drawing Sheets

BRAKE UNIT INCLUDING BRAKE DISC AND BRAKE LINING

FIELD OF THE INVENTION

The present invention relates to a brake unit including a brake disc of a material having a high thermal loading capacity and a brake pad that cooperates with it in tribological fashion.

RELATED TECHNOLOGY

A new generation of brake pads is made of material having a high thermal loading capacity. Among these are ceramic materials, in particular short-fiber reinforced C/SiC ceramic materials, as described in German Patent Document No. 197 11 829.1. Another brake pad is known from German Patent Document No. 43 22 113. Its brake disc has a bearing member of a steel, cast iron or aluminum material, on whose exterior ring sections is applied in each case a concentrically disposed layer of a thermally highly-loadable material, i.e., of a ceramic material or a metal material, metal sintered material, or of a metal-ceramic sintered material. This material is temperature-resistant up to over 1500° C. To prevent the brake pad from being damaged by excessive heating during braking maneuvers, provision is made for the ceramic material to have a heat-conducting metal filling to dissipate the heat to the metal bearing member, and for the brake disc to have a ventilated brake pad design.

Combining brake discs of this kind with a suitable brake pad is problematic. German Patent Document No. 43 06 721, for example, describes a conventional inorganic brake pad. However, brake pads of this kind are not stable enough.

Unpublished German Patent Document No. 197 11 830.5 describes a sintered brake pad made of powdered metal, primary carbon and, optionally, of additives, for a short-fiber reinforced C/SiC brake disc.

SUMMARY OF THE INVENTION

The object of the present invention is to devise a brake unit including a brake disc of a material having a high thermal loading capacity and a brake pad that cooperates with it in tribological fashion, the brake unit being stable over higher temperature ranges, but is relatively simple to manufacture.

This object is achieved by providing a brake unit having the features of claim 1.

The present invention provides for the brake pad to be made of a metal-ceramic material or a standard sintered metal pad.

In prior methods, sintered metal pads were only used in commercial vehicles or for the railroad. In the passenger car sector, they were not suited for use in conjunction with the gray cast iron brake discs that have been customary until now, since they did not offer adequate performance in terms of comfort (judder, squealing, stuttering). It now turns out surprisingly and, for one skilled in the art, unexpectedly that the usual disadvantages associated with known methods when commonly used gray cast iron brake discs are combined with sintered metal brake pads do not occur when ceramic brake discs are used. It also turns out that, when a ceramic brake disc is combined with a sintered metal pad, one can attain excellent coefficients of friction of from 0.3 to 0.5 and a temperature stability of from 900 to 1000° C.

The same holds true for brake pads having an at least partially ceramic binding phase. In response to temperatures of less than 1200° C., an only partially converted binding phase with an inorganic and an organic constituent arises during the heat treatment, depending on the polymers used.

The brake unit of the present invention constitutes an optimal combination with respect to an elevated thermal loading capacity on the part of the ceramic brake disc, in view of a reasonable service life of the brake pad, and in light of other tribological requirements, such as friction coefficient level or temperature dependence of the friction coefficient. Because of its material constitution, the brake unit of the present invention has a higher thermal loading capacity and is also more resistant to wear than conventional brake units.

The ceramic binding phase arises preferably through pyrolysis of at least one preceramic polymer. For example, conventional pad mixtures for organically bound, standard passenger-car pads may be used, the conventional organic binding agent being replaced by a preceramic polymer. The composition of these conventional, standard pads is well known to one skilled in the art. In this context, the composition may be a C-precursor, such as vinyl resins, or silicon-containing polymers. The binding phase may be introduced by a so-called polymer-pyrolysis method (PP method) and produced. The individual components are mixed, compacted and pyrolyzed at temperatures of up to 1200° C. for about 60 minutes and, if indicated, undergo a final processing. The ceramic binding phase resulting from the pad mixture and binding agent is mostly amorphous, i.e., vitreous. Depending on the type, it is temperature-stable up to 1600° C.

The metal constituent of the brake pad is selected, for example, from the group including copper and copper alloys, as well as iron and iron alloys. The metals are applied in the form of shavings, metal wool, or metal powder as an embedding phase. Advantageously contained, in addition, in the friction pad are carbon, coke or graphite, solid lubricants, such as $SbS_3$, $MoS_2$, $CaF_2$ and fillers, such as of ceramic, aluminum oxide, glass, mica dust, heavy spar, and/or iron oxide, which are used as scouring agents.

The brake disc is advantageously made of a ceramic material, in particular of oxide ceramic or of fiber-reinforced ceramic, such as C/C ceramic, SiC/SiC ceramic or C/SiC ceramic. The fibers are preferably isotropically oriented, since this achieves a uniformly high thermal conductivity in the brake pad's cross-section as well. This promotes lowering of the surface temperature in response to a stress loading.

BRIEF DESCRIPTION OF THE DRAWINGS

The present invention is elucidated in the following on the basis of the drawings, in which.

DETAILED DESCRIPTION

Figure 1:
FIG. 1 shows a light-microscopic, micro-structural image of a brake disc of the present invention having a high thermal conductivity.
Figure 2A:
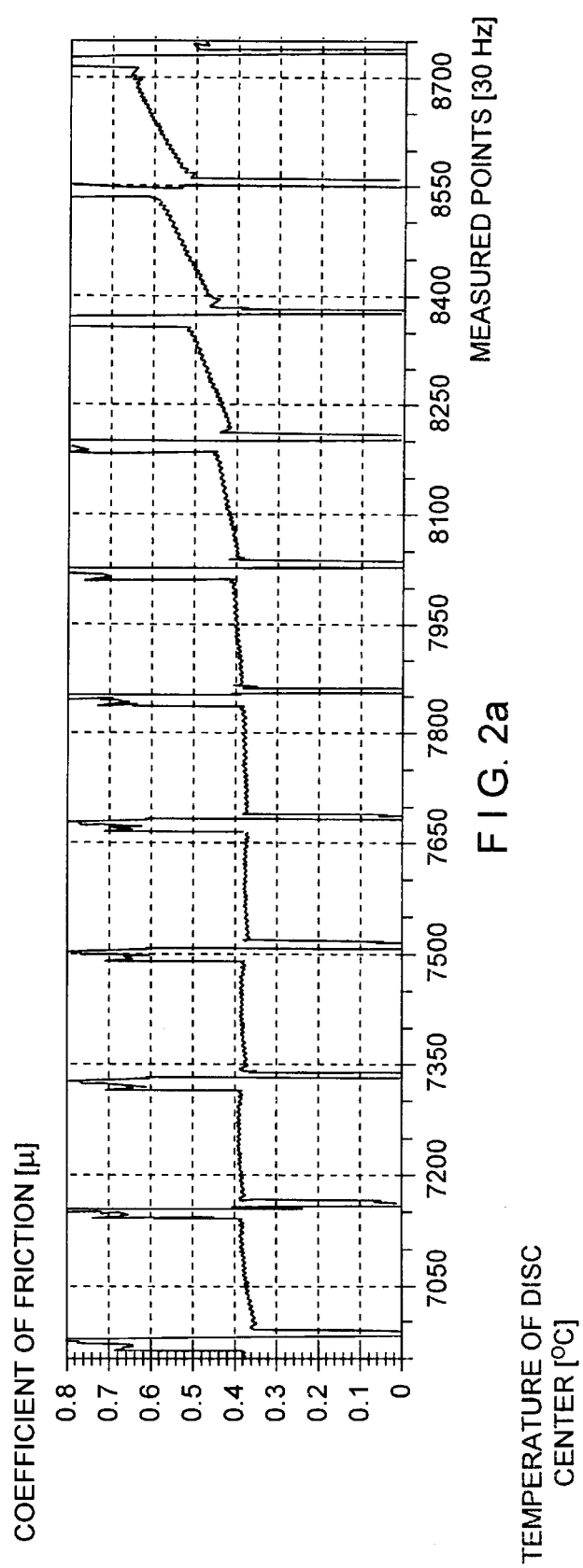
FIGS. 2a and 2b show graphs of results of a brake test using a brake disc according to FIG. 1 and a brake pad having an inorganically bound matrix.
Figure 2B:
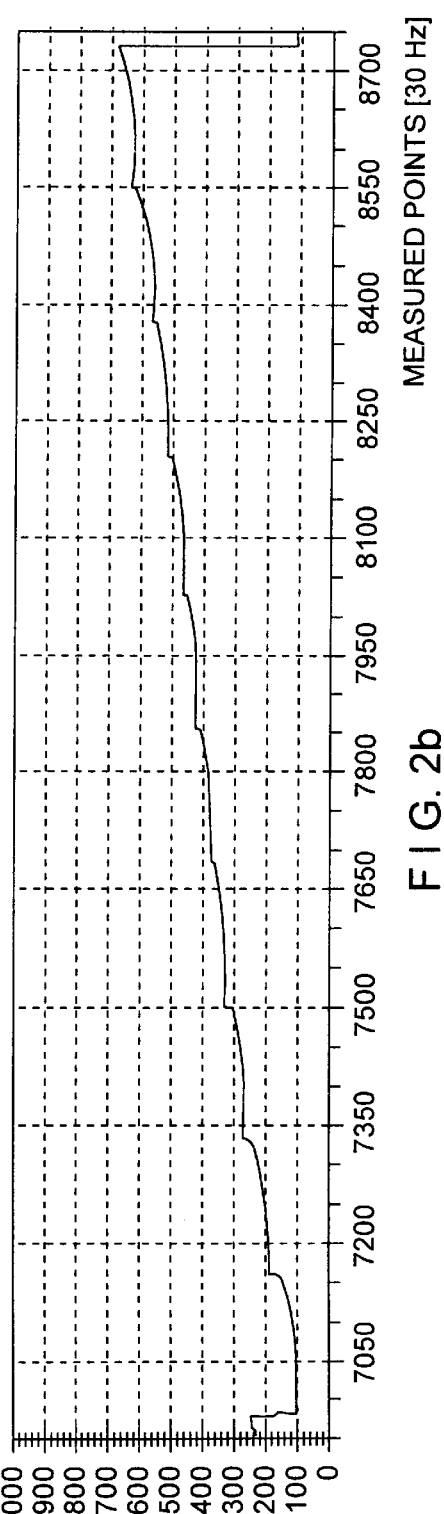

The brake disc shown in FIG. 1 is made of about 35–45% by volume of fibers, about 40–50% by volume of silicon carbide, and maximally of about 15% by volume of silicon. It is important in the manufacturing process (compare German Patent Document No. 197 11 829.1) that the parent substances be mixed as homogeneously as possible. In this manner, one obtains isotropically oriented fibers and only a few small pores in which pure silicon can collect during liquid siliconization (compare German Patent Document No. 197 11 829.1). The isotropic fiber arrangement and the reduction in pore size toward zero enhance the thermal conductivity of the resulting ceramic. To manufacture the brake pads, a mixture of metals and scouring agents is gradually mixed and homogenized. The polysiloxane is subsequently added. The mixture is sintered by hot-pressing and pyrolyzed. In the event that other preceramic polymers are used, the compact is pyrolyzed under protective gas. If indicated, the finished pad then undergoes final processing. It contains an at least partially ceramic binding phase. The degree of ceramization influences the comfort performance characteristics. A less than complete ceramization, e.g., between 20 and 80%, in particular between 40 and 60%, is preferred. It is particularly beneficial to do without the pyrolysis and to use the compact directly as the brake pad. The frictional heat released during braking maneuvers results in pyrolysis during the breaking-in process.

For the brake tests, a 285 mm diameter C/SiC brake disc having a metal brake pad and 5–15% by weight of polysiloxane H62C. from the Wacker Company was used as a preceramic binding phase. The metal filling material contained ⅔ steel wool and ⅓ copper powder. ½% by weight of $Al_2O_3$ was used as a scouring agent. As solid lubricants, maximally 5% by weight of molybdenum sulphide and/or calcium fluoride and/or graphite was added. The brake pressure was 15 bar at a velocity of 60–200 km/h.

The coefficients of friction measured were between 0.35 and 0.55. The temperature in the middle of the disc rose to over 600° C. This was due to the fact that the test arrangement was not allowed to completely cool between each of the braking cycles. These temperatures are not reached, however, in practical applications. Brake disc wear was measured at 0.2–0.3 mm, and brake pad wear at about 1–1.5 g.

Figure 3A:
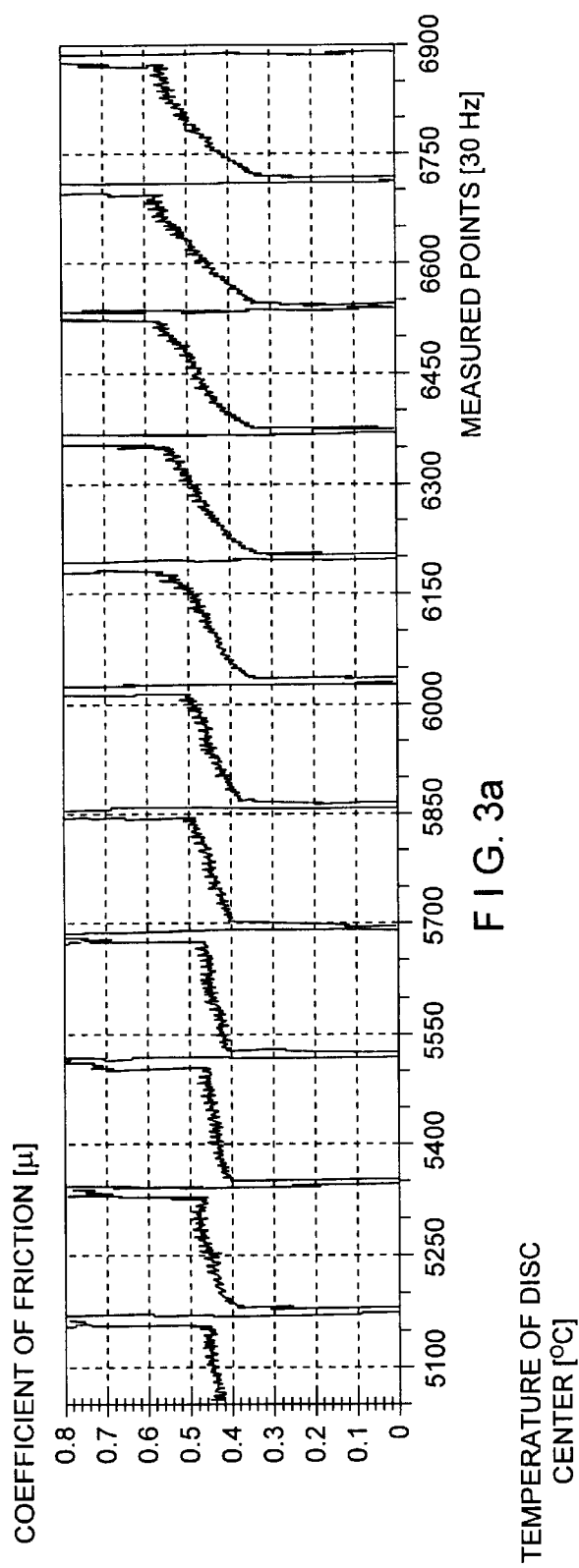
FIGS. 3a and 3b show graphs of results of another brake test, this time using a conventional sintered metal brake pad.
Figure 3B:
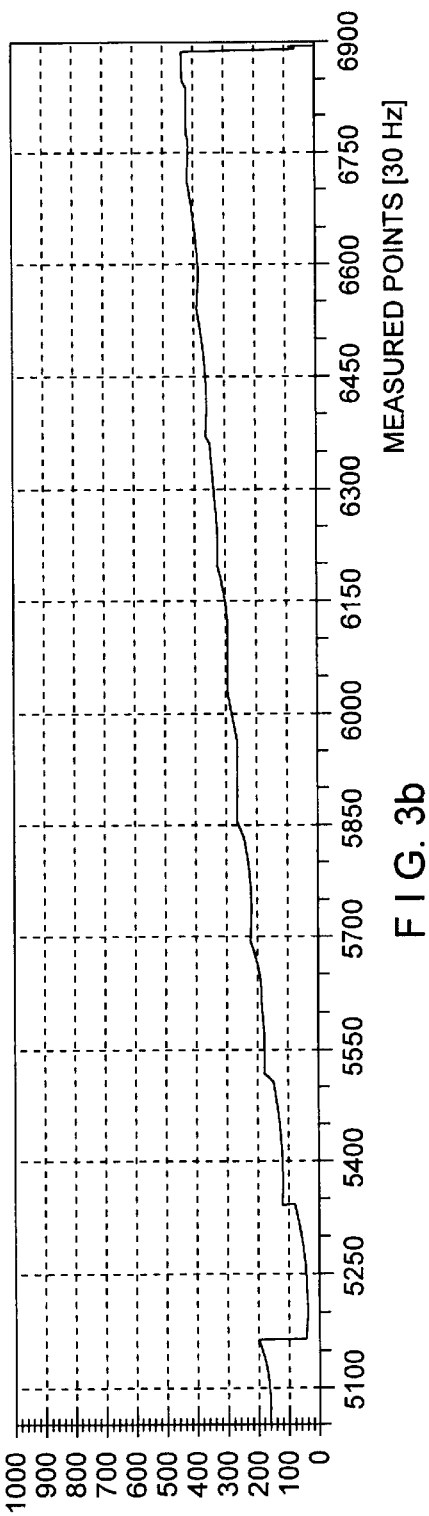

FIGS. 3a and 3b show the results of such a brake test performed with a conventional sintered metal brake pad. A conventional brake pad was used, which, due to its poor comfort performance characteristics, had only been used previously in prior methods in conjunction with conventional gray cast iron brake discs in commercial vehicles and for railroad uses. The coefficients of friction measured were between 0.4 and 0.6. The variation in the curve characteristic illustrates the "break-in characteristics" conditional upon the micro-roughness of the brake pad on the disc. The temperature in the middle of the disc remained below 500° C.

The brake disc of short fiber-reinforced C/SiC ceramic used during the tests exhibited a good thermal conductivity. This contributed to the temperatures not becoming excessive.

What is claimed is:

1. A brake unit comprising:
   a brake disc including a material that includes at least one ceramic; and
   a brake pad for cooperating with the brake disc in tribological fashion,
   wherein the brake pad includes a sintered metal material or an inorganically bound material including a ceramic binding phase and metal particles.

2. The brake unit as recited in claim 1 wherein the ceramic binding phase is capable of being produced through complete or partial pyrolysis of at least one preceramic polymer.

3. The brake unit as recited in claim 1 wherein the ceramic binding phase is capable of being produced through complete or partial conversion of the preceramic polymer during operation of the brake unit.

4. The brake unit as recited in claim 2 wherein the at least one preceramic polymer includes at least one C-precursor.

5. The brake unit as recited in claim 4 wherein the at least one C-precursor includes at least one of vinyl resins and silicon-based preceramic polymers.

6. The brake unit as recited in claim 5 wherein the silicon-based preceramic polymers include at least one of polysilanes, polysiloxanes, polysilazanes, polyborocarbosilanes, polyborosilazanes, polyborosilanes, polycarbosilazanes, and polycarbosilanes.

7. The brake unit as recited in claim 1 wherein the brake pad further includes at least one inorganic lubricant.

8. The brake unit as recited in claim 1 wherein the metal particles include at least one of copper, copper alloys, iron and iron alloys.

9. The brake unit as recited in claim 8 wherein the copper alloys include at least one of bronze and brass.

10. The brake unit as recited in claim 8 wherein the iron alloys include at least one of gray cast iron and steel.

11. The brake unit as recited in claim 1 wherein the metal particles are from at least one of shavings, metal wool and powder.

12. The brake unit as recited in claim 1 wherein the brake pad further includes carbon in a fibrous form.

13. The brake unit as recited in claim 1 wherein the brake pad further includes at least one solid lubricant.

14. The brake unit as recited in claim 13 wherein the at least one solid lubricant includes at least one of calcium fluoride, graphite and sulphide.

15. The brake unit as recited in claim 14 wherein the sulphide includes at least one of molybdenum sulphide and antimony sulphide.

16. The brake unit as recited in claim 1 wherein the brake pad further includes hard particles including at least one ceramic.

17. The brake unit as recited in claim 16 wherein the at least one ceramic includes at least one carbide.

18. The brake unit as recited in claim 17 wherein the at least one carbide includes at least one of boron carbide, silicon carbide, titanium carbide and metal carbides.

19. The brake unit as recited in one claim 1 wherein the brake pad further includes hard particles including at least one of aluminum oxide and glass.

20. The brake unit as recited in claim 1 wherein the at least one ceramic includes oxide ceramic, C/SiC material, C/C-SiC material, SiC/SiC material or and C/C material.

21. The brake unit as recited in claim 1 wherein the at least one ceramic includes at least one fiber-reinforced ceramic composite material including isotropically oriented fibers.

22. The brake unit as recited in claim 1 wherein the material of the brake disc includes a short fiber-reinforced C/SiC ceramic composite.

23. The brake unit as recited in claim 22 wherein the short fiber-reinforced C/SiC ceramic composite includes about 35–45% by volume of carbon fibers, about 40–50% by volume of silicon carbide, and maximally about 15% by volume of silicon.

* * * * *